United States Patent [19]

Kato

[11] Patent Number: 4,777,536
[45] Date of Patent: Oct. 11, 1988

[54] THERMAL PRINTING DEVICE
[75] Inventor: Nobuhisa Kato, Kanagawa, Japan
[73] Assignee: Fuji Xerox Co., Ltd, Tokyo, Japan
[21] Appl. No.: 44,002
[22] Filed: Apr. 29, 1987
[30] Foreign Application Priority Data
 Apr. 30, 1986 [JP] Japan .................................. 61-98249
[51] Int. Cl.$^4$ .............................................. H04N 1/40
[52] U.S. Cl. ................................ 358/298; 346/76 PH
[58] Field of Search ................................ 358/298, 296; 346/76 PH; 400/120

[56] References Cited
U.S. PATENT DOCUMENTS

| 4,368,491 | 1/1983 | Saito ................................ 358/298 X |
| 4,516,135 | 5/1985 | Todoh .............................. 358/298 X |
| 4,532,523 | 7/1985 | Tanaka ............................ 358/298 X |
| 4,558,328 | 12/1985 | Takanashi et al. ............. 358/298 X |

FOREIGN PATENT DOCUMENTS 60-154772 8/1985 Japan .

Primary Examiner—Clifford C. Shaw
Attorney, Agent, or Firm—Finnegan, Henderson Farabow, Garrett and Dunner

[57] ABSTRACT

A printing device in which pulses corresponding in number to gradations to be visibly expressed are applied to the heat generating elements of a thermal had in such a manner that the heat generating elements are controlled in heat generation time. Image data storing means stores, as a recording unit of image data, image data of picture elements which can be recorded in one action. Gradation-to-bit-train conversion means receive the image data from the image data storing means in units of picture elements, and output bit trains representing the numbers of pulses according to the gradation to be expressed. Latch means latch the outputted bit trains thus outputted, selector means select bit for pulse application control from the latched bit trains, and count means cause the selector means to perform the selecting operation a predetermined number of times according to the gradation to be expressed, for all picture elements of each recording unit to control the number of pulses applied to each of the heat generating elements.

6 Claims, 15 Drawing Sheets

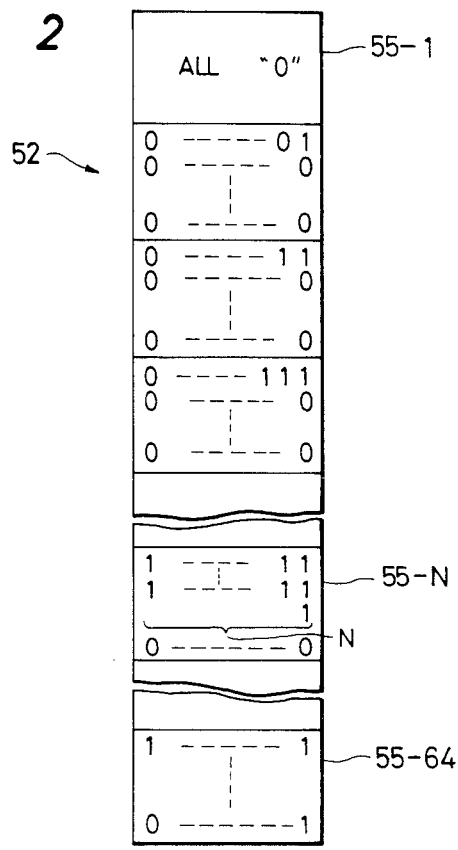

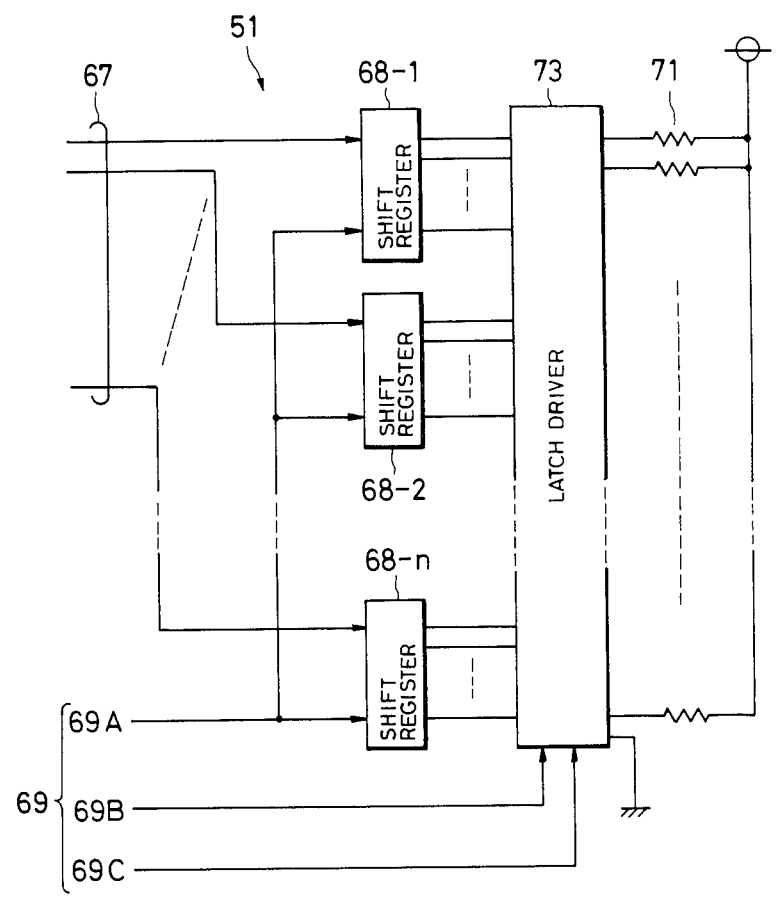

FIG. 8
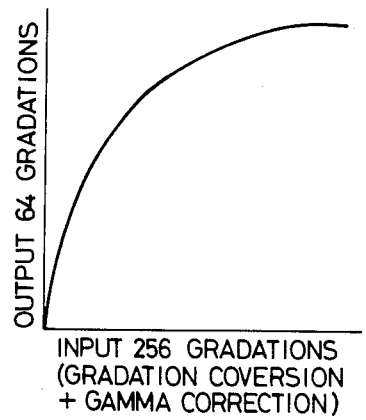
INPUT 256 GRADATIONS
(GRADATION COVERSION
+ GAMMA CORRECTION)
FIG. 9
| | | |
|---|---|---|
| 255 | 63 | } 8BYTES |
| 254 | 63 | |
| 253 | 63 | |
| 252 | 63 | |
| 251 | 63 | |
| | 62 | |
| ⋮ | ⋮ | |
| 5 | 2 | |
| 4 | 2 | |
| 3 | 2 | |
| 2 | 1 | |
| 1 | 1 | |
| 0 | 0 | |
FIG. 20
PRIOR ART
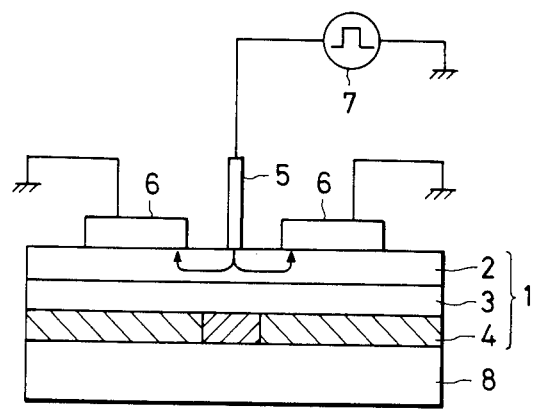

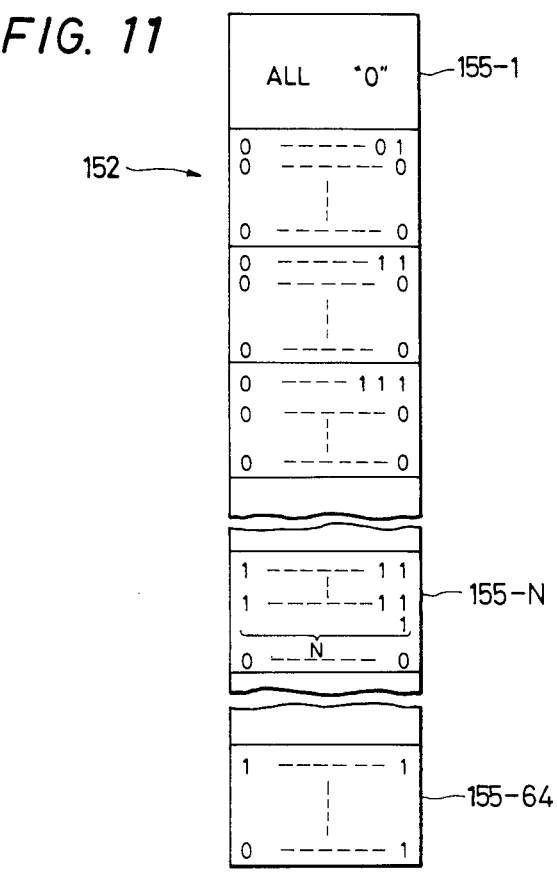

(a) DATA 167
(b) CLOCK 169
(c) LATCH 174
(d) STROBE 175

ADDRESS
0 — 1ST PULSE WIDTH
1 — 2ND PULSE WIDTH
2 — 3RD PULSE WIDTH
n−1

OUTPUT 64 GRADATIONS
INPUT 256 GRADATIONS
(GRADATION CONVERSION)

| 255 | 63 | } 8BYTES |
| --- | --- | --- |
| 254 | 63 | |
| 253 | 63 | |
| 252 | 63 | |
| 251 | 62 | |
|  | 62 | |
|  | 62 | |
|  | 62 | |
| ⋮ | ⋮ | |
| 7 | 1 | |
| 6 | 1 | |
| 5 | 1 | |
| 4 | 1 | |
| 3 | 0 | |
| 2 | 0 | |
| 1 | 0 | |
| 0 | 0 | |

| 255 | 63 | } 8BYTES |
| --- | --- | --- |
| 254 | 63 | |
| 253 | 63 | |
| 252 | 63 | |
| 251 | 63 | |
|  | 62 | |
| ⋮ | ⋮ | |
| 5 | 2 | |
| 4 | 2 | |
| 3 | 2 | |
| 2 | 1 | |
| 1 | 1 | |
| 0 | 0 | |

OUTPUT 64 GRADATIONS

INPUT 256 GRADATIONS
(GRADATION CONVERSION
+ GAMMER CORRECTION)

RAM 46

THERMAL PRINTING DEVICE

FIELD OF THE INVENTION

This invention relates to a printing device capable of recording images through half-tones, and more particularly to a printing device that uses a thermal head to express gradations in half-tones by dot images.

BACKGROUND OF THE INVENTION

A printing device for recording image data with a thermal head is advantageous in that the noise level of recording is much lower than the noise level of an impact type printing device. A thermal head is also potentially smaller and less costly to manufacture than an impact printer, an ink jet printing device, or a laser-operated electrostatic printing device.

In a printing device with a thermal head, the energy level of thermal pulses outputted by heat generating elements can be varied. In this manner, a thermal printing device can express gradations in image tone by varying patterns of dots produced by a thermal color-developing recording sheet or an electrical heat-generating sheet.

FIG. 20 shows a theoretical arrangement of a printing device using an electrical heat-generating sheet. The electrical heat-generating sheet 1 comprises a resistance layer 2, a supporting layer 3, and an ink layer 4. The supporting layer 3 may also serve as the resistance layer 2 as the case may be.

A recording electrode 5 and common electrodes 6 are brought into contact with the sheet 1. When a voltage having a pulse width selected according to a desired recording pattern is applied to the electrode 5 by a signal voltage generating section 7, current flows to the common electrodes 6 through the resistance layer 2. In this operation, the current generates Joule heat that is conducted through the supporting layer 3 to the heat-molten ink layer 4 to melt the ink therein, and the molten ink is transferred as a dot onto a recording sheet 8.

In the printing device, the pulse width of the pulse applied to the recording electrode 5 may be varied to vary the level of the resulting heat pulse. The size of the area in the ink layer 4 where the ink is made molten will then change in accordance with the applied thermal eneergy. In other words, the diameter of a printing dot can be changed by controlling the time width of the pulse applied to the recording electrode. Accordingly, various gradations in dot size can be obtained by controlling the pulse width as described above.

FIG. 21 shows a printing device disclosed in Japanese Patent Application (OPI) No. 154772/1985 (the term "OPI" as used herein means "an unexamined published application").

In the printing device, in response to a request signal 23, an image signal generating section 10 outputs image data 21 comprising discrete picture elements wherein each picture element is represented by n bits. The outputted image data is applied through a tri-state gate 11 to a memory 12 and is stored in the memory. Stored data corresponding to 1 picture elements is read out, of the memory 12 and each picture element read out comprises n bits that are converted into m bit data by a gamma conversion table 13. The m bit data is suitable for controlling thermal printing elements. The m×l bits of data are transferred to a shift register circuit 15 including l m-bit shift registers.

The data outputted by the shift register circuit 15 are latched by a counter circuit 16 with the aid of a control signal 27. The counter circuit 16 has l counter units of m bits each, and provides a carry signal 30 depending on the data. A set signal 29 and a carry signal 30 sets and resets an l-bit flip-flop 17, respectively, so that l pulse width signals 31 are obtained for the data. During this operation, the next l×m data are transferred to the shift register circuit 15.

In the conventional printing device, one recording unit corresponding to the number of dots that can be printed in one recording operation is small, being only for l picture elements. Therefore, the technical concept of the conventional printing device is applicable to a serial printer having a recording unit in the order of thirty-two dots corresponding to thirty-two picture elements. The application of this technical concept to a line printer having a corresponding recording unit in the range of 1728 (54 characters) dots to 3072 dots (96 characters) per line is not practical, because a very large and complicated circuit would have to be provided to individually control the many heat generating elements of the thermal load.

A recent line-type thermal head has been designed to group the heat generating elements into blocks wherein one block corresponds to several hundred heat generating elements, and a printing control pulse is inputted for every block. If the aforementioned technical concept is applied to this line-type thermal head, then the resultant printing device is still very complex in construction and in circuitry, and the realization of an effective line-type thermal printing device is not practical.

OBJECTS AND SUMMARY OF THE INVENTION

Accordingly, an object of the present invention is a thermal printing device that can carry out a high speed recording operation.

Another object of the present invention is a thermal printing device utilizing a relatively simple circuit even in the case of printing a line at a time.

Still another object of the present invention is a thermal printing capable of a high printing rate with many, precise half-tone gradations.

These and other objects are attained by a thermal recording system including a plurality of thermal printing elements to be energized at one time in one recording operation to record an image signal comprising a plurality of picture elements represented by gradation data corresponding to the volume of the picture elements, the system comprising gradation data storing means for storing as a recording unit a plurality of gradation data corresponding to a plurality of picture elements to be recorded in the recording operation, gradation-to-bit-train conversion means for receiving the gradation data corresponding to the recording unit and for outputting for each of the gradation data a corresponding bit train representing the number of pulses according to gradations to be supplied to a thermal printing element to form a visible image of the corresponding gradation data, latch means for receiving the bit train and for latching the bit train corresponding to each of the gradation data, shift register means for storing print data associated with each of the thermal printing elements, the print data comprising a train of pulses for energizing the associated thermal printing element, and selector means coupled to the latch means and the shift register means for transferring a selected bit of latched bit train corresponding to each of the gradation data to selected ones of the shift register means, the latched bit train being adapted to energize the thermal printing element associated with the selected shift register means with a pulse train representing a gradation data to be recorded by the associated thermal printing element.

BRIEF DESCRIPTION OF THE DRAWINGS

The manner by which the above objects, and other objects, features, and advantages of the present invention are attained will be fully apparent when the following detailed description is considered in view of the accompanying drawings, wherein:

FIG. 2 is an explanatory diagram showing the arrangement of a half-tone gradation-to-bit-train conversion table for the printing device of FIG. 1;

FIG. 3 is an explanatory diagram showing one example of gradation tables which are provided for gradations in the gradation-to-bit-train conversion table;

FIG. 4 is a block diagram of a thermal head for use in the printing device of FIG. 1;

FIG. 8 is a characteristic diagram for a description of the operation in which the gradation conversion and a gamma correction are carried out;

FIG. 9 is an explanatory diagram showing the contents of the gradation-to-bit-train conversion table used in connection with the operation described with reference to FIG. 8;

FIG. 11 is an explanatory diagram showing the arrangement of a gradation-to-bit-train conversion table for use by the printing device shown in FIG. 10;

FIG. 12 is an explanatory diagram showing one example of gradation tables which are provided for respective gradations in the gradation-to-bit-train conversion table of FIG. 10;

FIG. 20 is an explanatory diagram for a description of the operating principle of a conventional printing device.

DETAILED DESCRIPTION OF THE INVENTION

Figure 1:
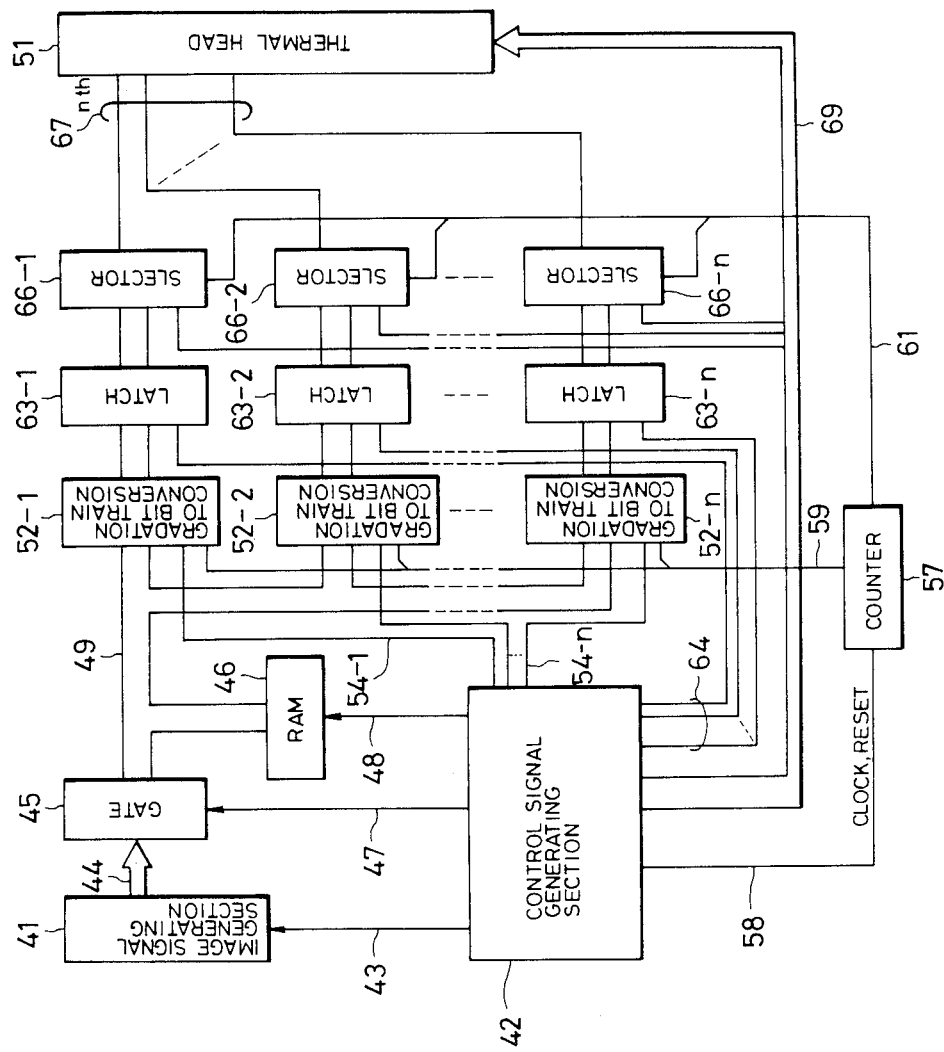
FIG. 1 is a block diagram of a first example of a printing device according to the present invention.

A first embodiment of a printing device according to the present invention is shown in FIG. 1. In the printing device, an image signal generating section 41 generates an image signal that is to be reproduced as a visible image, and outputs gradation data 44 representing the gradations of picture elements comprising the image signal according to a control signal 43 outputted by a control signal generating section 42. The gradation data 44 may comprise a series of picture elements representing one scan or raster. The picture elements are represented, for instance, by 8 bits each, and in this case, each picture element can be expressed as one of 256 different gradations or image density levels.

The gradation data 44 are written into a RAM (random access memory) 46 through a gate 45 which is for instance a tri-state gate. In this operation, the gate 45 is controlled by a control signal 47, and the RAM 46 is controlled by a control signal 48. The control signals 47 and 48 are provided by the control signal generating section 42.

In the printing device of FIG. 1, the RAM 46 is designed to store the gradation data for one raster or scan line of picture elements as a single recording unit. After the gradation data for one raster have been written in the RAM 46, the control signal 48 causes the gradation data to be read out successively in units of picture elements. This reading operation is carried out a predetermined number of times corresponding to the number of gradations to be recorded. In this operation, the gradation data 49 are read out while being divided into lines the number of which is equal to the number of the data input system of shift registers (not shown) provided for a thermal head. It is assumed that the thermal head 51 has shift registers having n systems each, and that each shift register can receive data of n system in a parallel mode. The gradation data 49 are supplied, to n gradation-to-bit-train conversion tables 52-1 through 52-n through n data transfer lines. The application of the gradation data 49 to one of the gradation-to-bit-train conversion tables 52-1 through 52-n is controlled by table selecting signals 54-1 through 54-n which are supplied to the tables 52-1 through 52-n from the control signal generating section 42. The end results is that the gradation data from a first block, i.e., the gradation data corresponding to picture elements PE1–PEj are provided successively, to the gradation-to-bit-train conversion table 52-1. The gradation data for picture elements PEj+1–PE2j are supplied to table 52-2 and so on.

In the gradation-to-bit-train conversion table 52$i$ selected by the table selecting signal 54$i$ and with the n-bit gradation data 49$i$ for a picture element PE$i$ as address data, a signal conversion is carried out to generate gradation data to allow the thermal head to perform the pulse width control according to the given gradations.

FIG. 2 shows an arrangement of a gradation-to-bit-train conversion table. Each gradation-to-bit-train conversion table 52 consists of a number of gradation table 55$i$ equal in number to the number of given gradations. It is assumed that, in the first example of the printing device shown in FIG. 1, although the eight-bit gradation data expressing a picture element is capable of representing 256 different values or levels, in fact only sixty-four different gradations are expressed as density levels, and, therefore, gradation data 49 expresses sixty-four gradations as input data. In this case, the gradation-to-bit-train conversion table 52 consists of sixty-four gradation tables 55-1 through 55-64.

Each gradation table 55$i$ is made up of eight bytes of eight bits each as shown in FIG. 3, so that each of the sixty-four (64) gradations is expressed as a different sixty-four (64) bit value. In FIG. 3, all the bits of the first byte, "byte 1", the second byte, "byte 2", and the third byte, "byte 3", are at logic level "1" (hereinafter referred to merely as "1", when applicable), and in the fourth byte, "byte 4", three bits including the LSB are "1". The remaining bits of byte 4 are at logic level "0" (hereinafter referred to merely as "0", when applicable), and all the bits of the fifth byte, "byte 5", through the eighth byte, "byte 8" are "0". Therefore, the gradation table of FIG. 3 represents the 27th gradation based upon the number of logic levels "1".

Referring back to FIG. 2, all the 64 bits in the first gradation table 55-1 are "0", thus expressing the first gradation, and the N-th gradation table head N-1 bits at logic level "1", thus expressing the N-th gradation (N being an integer smaller than sixty-four (64)), and in the last gradation table 55-64 63 bits are "1", thus expressing the 64th gradation as a value 63.

A counter 57 receives a clock signal and a reset signal from the control signal generating section 42 and supplies a carry signal to the control signal generating section 42, through a signal line 58. A count value of the counter 57 is divided into a high-order count value signal 59 representing the high-order bits of the count value and a low-order count value signal 61 representing the low-order bits. The high-order count value signal 59 is supplied to the gradation-to-bit-train conversion tables 52-1 through 52-n.

In the gradation-to-bit-train conversion table 52 selected by the table selected signal 54, a table region in the gradation table 52 is specified in bytes according to the numerical value specified by the high-order count value signal 59. For instance when the signal 59 specifies the numerical value "0", and the gradation data specifies, as address data, the gradation table 55-28 shown in FIG. 3, the first byte, "byte 1", is specified in FIG. 3. In this case, the data of the first bypte (all the eight bits being "1") are outputted by the gradation-to-bit-train conversion table 55-28. When the first byte is outputted, then the high-order count value signal 59 expresses the numerical value "1", and the second byte is read out, and so forth until all the bytes of gradation table 55-28 have been outputted.

In this manner, the n gradation-to-bit-train conversion tables 52-1 through 52-n output bit train signals corresponding to gradations expressed by the gradation data 49. These output signals are transferred in parallel to corresponding latch circuits 63-1 through 63-n so that the data are latched. The control signal generating section 42 outputs control signals 64 to allow the latch circuits 63-1 through 63-n to latch the input signals.

The data held in the latch circuits 63-1 through 63-n are supplied in parallel to corresponding selectors 66-1 through 66-n, respectively. On the other hand, the aforementioned lower-order count value signal 61 is supplied to the selectors 66-1 through 66-n, so that, according to the count value expressed by the lower-order count value signal, the data are selected bit by bit, and are supplied, as selection data 67, to corresponding shift registers 68-1 through 68-n of the thermal head 51 (FIG. 4). The selectors 66-1 through 66-n output the selection data in a parallel mode to the corresponding shift registers 68-1 through 68-n. In each of the selectors 66-1 through 66-n, the selection data are inputted, in a serial mode, bit by bit into the above-described shift registers in the n stages which are provided for the thermal head 51.

Figure 5:
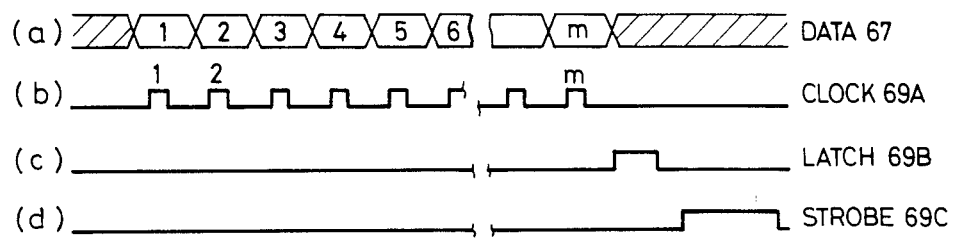
FIG. 5 is a time chart for a description of the operation of the printing device of FIG. 1.

FIG. 4 shows a concrete arrangement of the thermal head 51, and FIG. 5 is a time chart for a description of the operation of he thermal head. As shown in FIG. 4, the thermal head 51 has n shift registers 68-1 through 68-n corresponding to blocks. The selection data 67 are supplied to the shift registers separately according to the n blocks. Of the control signals 69 outputted by the control signal generating section 42, a clock signal 69A (the part (b) of FIG. 5) is applied to the shift registers 68-1 through 68-n. In synchronization with the clock signal 69A, the selection data 67 (the part (a) of FIG. 5) are inputted bit by bit into the shift registers. In this manner, m selection data where m is a number determined by dividing the total number of heat generating elements 71 of the thermal head 51 by the number n of the blocks, are set in the shift resisters 68-1 through 68-n, where they are subjected to serial-to-parallel conversion so as to be supplied to a latch driver 73.

The latch driver 73 operates to latch the data with the aid of a latch signal 69B (the part (c) of FIG. 5) and to control the energization of the heat generating elements 71. That is, for the logic level "1" of the selection data, the heat generating elements 71 are electrically energized for a predetermined period of time, so that the electrical energy is converted into thermal energy. Thus, one unit of thermal energy control to print one raster has been achieved.

By way of example, it is assumed that the printing device processes signals of four blocks (n=4), and each of the blocks has 256 heat generating elements 67 (m=256). In this case, the total number of the heat generating elements 67 is 1024 (256×4). The numbers of the gradation data 49 which are read out while the first through m-th clock signals 69A (FIG. 5) are produced are as shown in Table 1 below:

TABLE 1

|       |   | Clock Signal |     |     |      |
|-------|---|-----|-----|-----|------|
|       |   | 1   | 2   | ... | 256  |
| Table | 1 | 1   | 2   | ... | 256  |
|       | 2 | 257 | 258 | ... | 512  |
|       | 3 | 513 | 514 | ... | 768  |
|       | 4 | 769 | 770 | ... | 1024 |

In this case, 256 gradation data 49 are read out for each of the four blocks, and are converted into a 64-bit binary signal by the gradation-to-bit-train conversion table 52, and the binary signal is set in the shift registers 68 of the thermal head 51. The gradation-to-bit-train conversion tables 52 and the selectors 66 are controlled by the high-order count value signal 59 and the lower-order count value signal 61 which are outputted by the counter 57, respectively. In the above-described case, these signals 59 and 61 are each 3 bits, and the content of the high-order count value signal 59 is increased by +1 whenever a carry occurs with the content of the low-order count value signal 61.

In the thermal head 51, the heat generating elements 71 are energized according to pulse widths corresponding to gradations. In the case where the thermal head is of the type that the heat generating elements are brought into contact with base layer side of an ink donor film (or thermal recording medium) the surface of which is coated with thermal sublimations type ink, and the time width of the composite pulse of a number of pulses changes, for instance, to 3 ms, 5 ms, etc., according to the heat generating elements, the ink is transferred in correspondence to the amounts of thermal energy onto a recording sheet (not shown) placed on the ink donor film, thus expressing the gradations with dots.

If a different thermal recording medium is used or a different recording system is employed, then the resultant recorded image will be different even though the thermal head 51 is operated in the same manner. This difficulty is eliminated as follows: In the printing device of the invention, the gradation data 44 are corrected in the image signal generating section 41 in advance, or they are corrected in the gradation-to-bit-train conversion table 52. The gradation-to-bit-train conversion table 52 is further used to make an adjustment when the number of gradations inputted is different from the number of gradations outputted.

Figure 6:
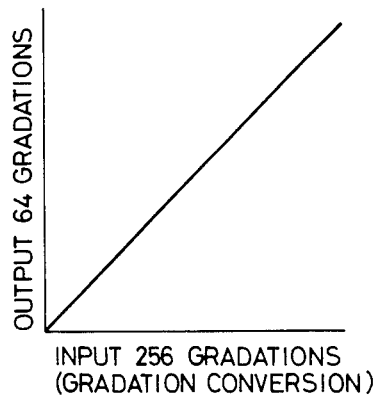
FIG. 6 is a characteristic diagram for a description of gradation conversion in the printing device of FIG. 1.
Figure 7:
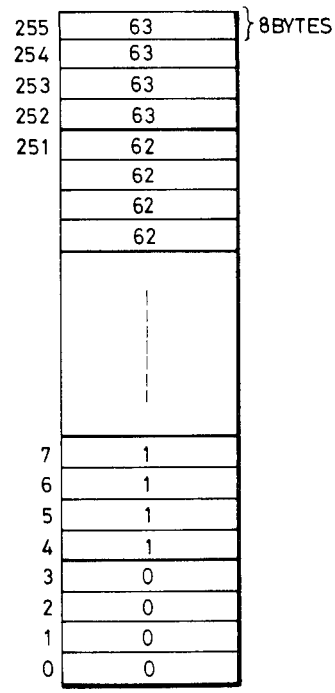
FIG. 7 is an explanatory diagram showing the contents of the gradation-to-bit-train conversion used for gradation conversion.

FIG. 6 shows a linear gradation conversion in which 256 gradations fully expressed with 8 bits are inputted while 64 gradations are outputted, and the inputs and the outputs are in linear relation to each other. In this conversion, four gradations on the input side correspond to one gradation on the output side. Therefore, the content of the gradation-to-bit-train conversion table is as shown in FIG. 7. In FIG. 7, numerical data 255 down to 0 indicated on the left end are the numbers of gradations inputted, and numerical data 63 down to 0 in the frames are the number of gradations obtained through the conversion. Since the inputs and the outputs are in a linear relation to each other as was described above, four gradations on the input side are converted into one gradation on the output side at all times.

FIG. 8 shows the case where not only gradation conversion but also gamma correction is carried out. In this case, for compensation of the characteristic of the thermal recording medium, the gradations are nonlinearly corrected as shown in FIG. 9. The correction curve is determined according to the characteristic of the thermal recording medium.

As is apparent from the above description, the provision of the gradation-to-bit-train conversion tables 52 makes it possible not only to set the time width of the pulse to be applied but also to adjust the number of gradations and to change the gradations to those which are desired. The gradation-to-bit-train conversion tables 52 may be made up of ROMs (ready-only-memories), or may be made up of RAMs (random access memories) so that the contents thereof can be changed by the operator. It goes without saying that a plurality of groups of gradation-to-bit-train tables 52 may be provided so that they may be selectively used according to the operator's desire or the nature of the image data.

In the first example of the printing device described above, the thermal sublimation type ink donor film is employed. However, it is obvious that the technical concept of the first embodiment of the printing device is applicable to a printing device which uses a heat-sensitive color development type recording sheet, or to any other printing device which can reproduce half-tones by controlling thermal energy. Furthermore, in the above-described printing device, a plurality of gradation-to-bit-train conversion tables are employed; however, common gradation-to-bit-train conversion tables may be provided to reduce the number of gradation-to-bit-train conversion tables. In the latter case, the printing device formed is lower in manufacturing cost, although its image processing speed is somewhat lower.

Figure 22A:
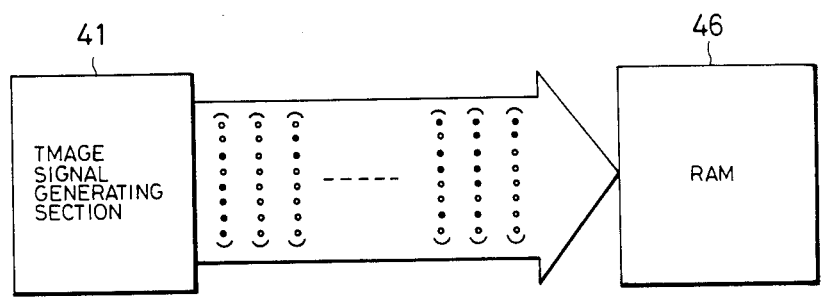
FIGS. 22(A) through 22(G) are schematic diagrams for illustrating an example of the operation of the printer of the invention.
Figure 22B:
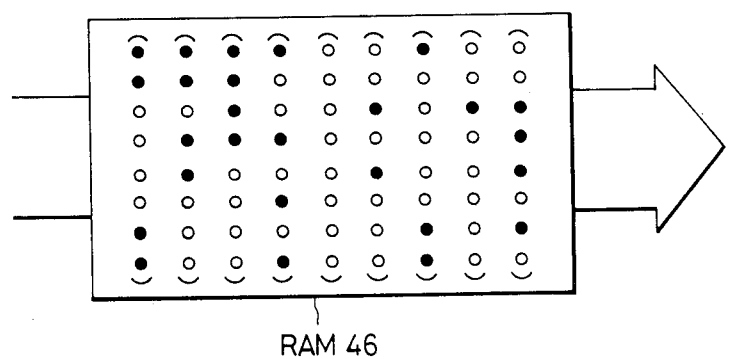

FIGS. 22(A) through 22(G) illustrate the operation of the thermal printing device of the present invention as shown in FIG. 22(A), the image signal generating section 41 outputs gradation data corresponding to the picture elements wherein each gradation data is represented by one byte (8 bits). As shown in FIG. 22(A), a dark dot represents a bit having for example a high value.

The gradation data for each picture element, that is 8 bits of data for one picture element, are applied from the image signal generating section 41 to the RAM 46 in a parallel mode.

Figure 22C:
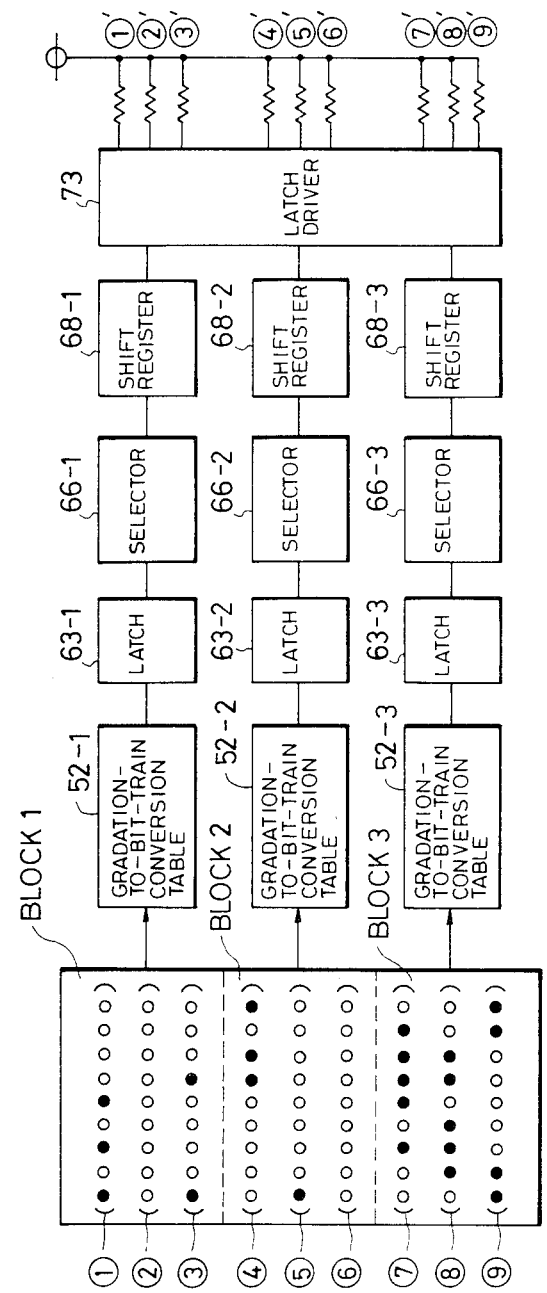

The RAM 46 stores the gradation data for one raster or scan line of picture elements as a single recording unit. For example, the number of picture elements for one raster is shown to be nine in FIG. 22(B). The stored gradation data for one raster in the RAM 46 is divided into N blocks wherein the number N is equal to the number of the data input systems of shift registers 68i provided for the thermal resistors. FIG. 22(C) shows, an example when N=3.

Figure 22D:
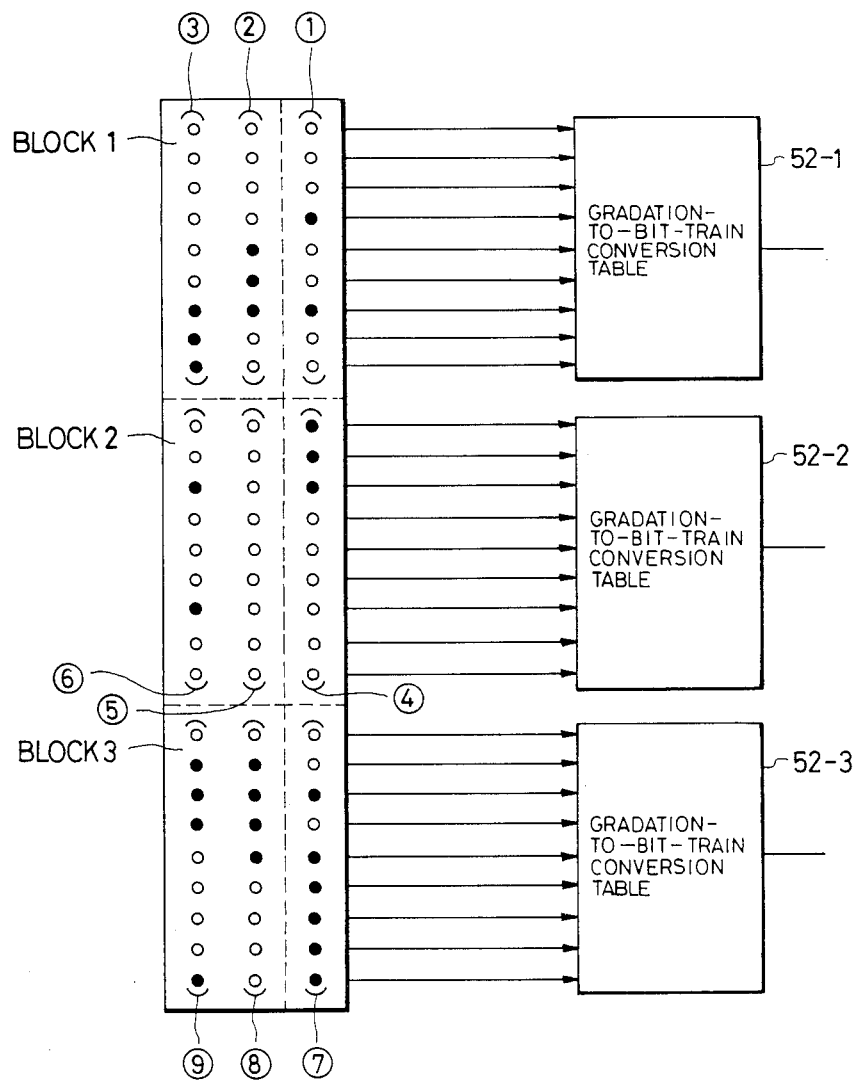

The RAM 46 reads out gradation data for each block, in a parallel mode. In this case, for instance, gradation data ①of "Block 1", gradation data ④ of "Block 2" and gradation data ⑦ of "Block 3" are read out in a parallel mode, wherein each of the gradation data ①, ④, ⑦ is represented by one byte (8 bits), and is outputted in a parallel mode, as shown in FIG. 22(D). From the tables 52-1 through 52-3 to the shift registers 68-1 through 68-3, the operation of the data transmission is the same, and is made in a parallel mode, in order to increase the recording rate of the thermal printer. Accordingly, the following operation will be described with reference to the conversion table 52-1, only.

Figure 22E:
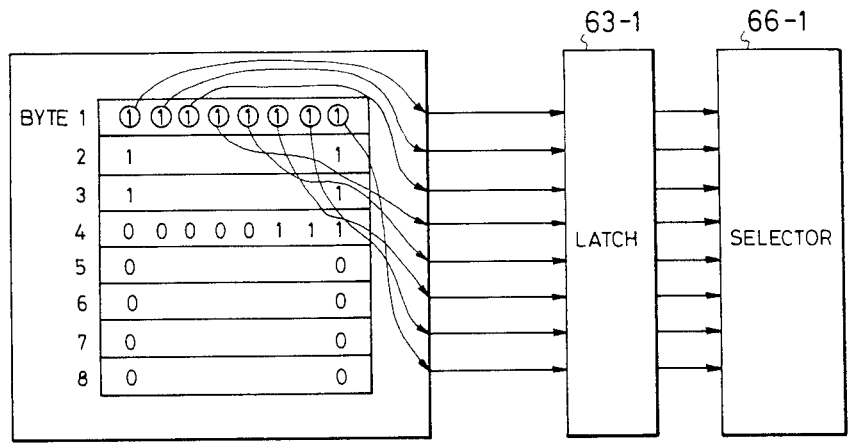
Figure 22F:
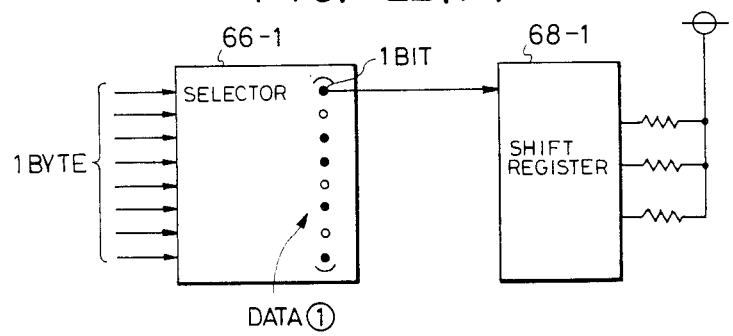
Figure 22G:
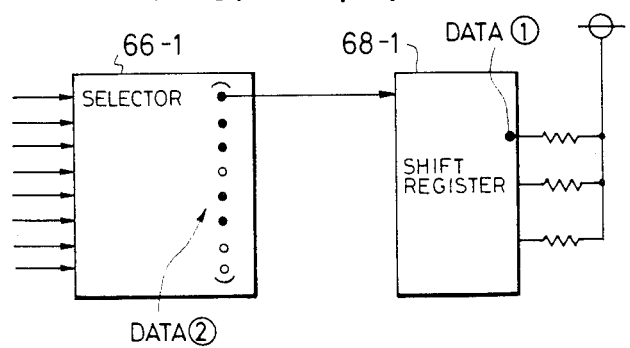

As explained above, the conversion table 52-1 includes gradation tables 55-1 through 55-64. One of the tables 55-1 through 55-64, as shown in FIG. 2, is addressed by a byte of gradation data, i.e., data ①. It is assumed that the selected table is 55-27, as shown in FIG. 3. First, the 8 bits of gradation data from table 55-27 are outputted to the latch 63-1, in a parallel mode, as shown in FIG. 22(E). The particular byte from among the 8 bytes of table 55-27 is selected by the signal 59 from the counter 57 which is applied as an input to the table 52-1. The latch 63-1 outputs the data of the first byte of table 55-27 to the selector 66-1 in a parallel mode. Thus, the 8 bits of byte 1 of the table 55-27 are supplied to the selector 66-1, and a desired one of the 8 bits is selected by the signal 61 generated from the counter 57. The selected bit is outputted from the selector 66-1 to the shift register 68-1 as shown in FIG. 22(F). After only one of the bits of byte 1 has been transferred by the selector 66-1 to the shift register 68-1, then data ② of "Block 1" latched in the latch 63-1 is supplied to the selector 66-1 and a selected bit of byte 1 of data ② is transferred from the selector 66-1 to the shift register 68-1 as shown in FIG. 22(G). Similarly a selected bit of byte 1 of data ③ is transferred to the register 68-1.

One recording operation is then carried out as shown in FIG. 5, (m=3).

By the above operation, one bit of data is recorded by each thermal element. In this embodiment, since 64 bits of data represent each gradation data, the above-described operation is carried 64 times to form a visible image of the corresponding gradation data for one raster.

Figure 10:
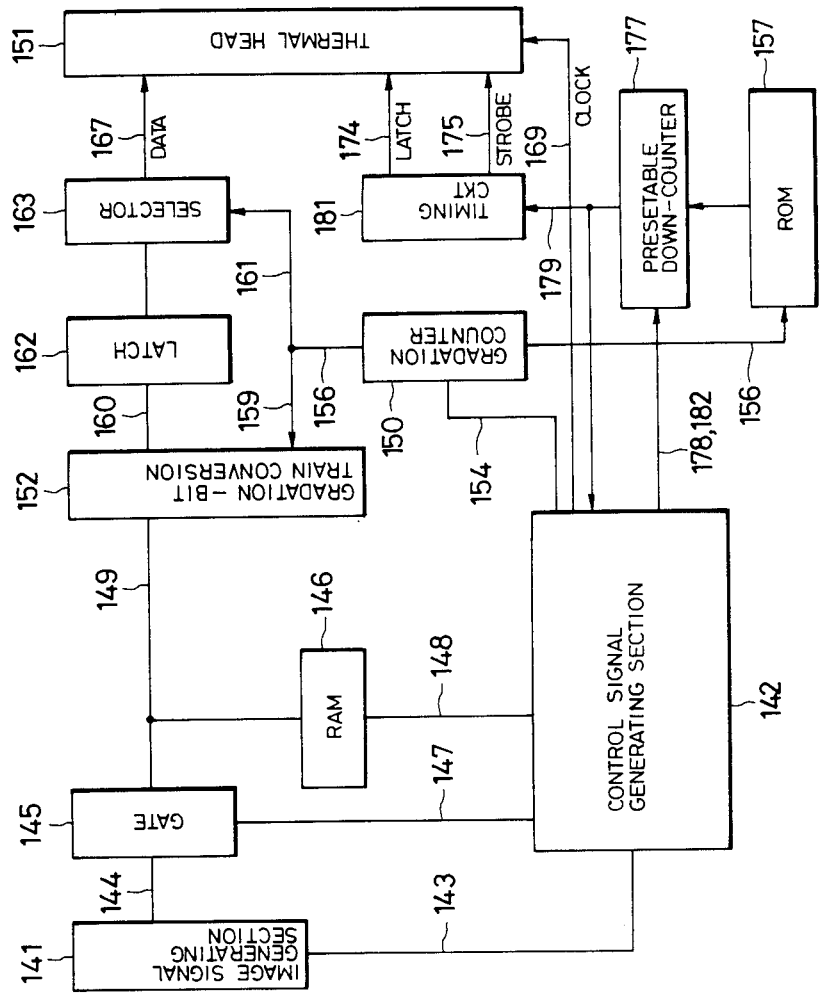
FIG. 10 is a block diagram of a second example of the printing device according to the present invention.

FIG. 10 is a block diagram of a second embodiment of the printing device according to the present invention. In the printing device shown in FIG. 10, an image signal generating section 141 operates to generate an image signal to be reproduced as a visible image, and outputs gradation data 144 representing the gradations of picture elements with the aid of a control signal 143 outputted by a control signal generating section 142. Each gradation data 144 corresponds to a picture element as is represented by 8 bits. Thus, in this case, each picture element can be expressed as one of as many as 256 gradations. The gradation data 144 are written in a RAM (randon access memory) 146 through a gate 145 which is for instance a tri-state gate. In this operation, the gate 145 is controlled by a control signal 147, and the RAM 146 is controlled by a control signal 148.

In the printing device of FIG. 10, the RAM 146 is designed to store the gradation data for one raster as one recording unit. After the gradation data for one raster have been written in the RAM 146, with the aid of a control signal 148 the gradation data are read out successively in the units of picture elements. This reading operation is carried out a predetermined number of times corresponding to the number of gradations to be recorded. The gradation data 149 thus read out are supplied to a gradation-to-bit-train conversion table 152. The gradation-to-bit-train conversion table 152 uses the gradation data 149 as address data and carries out a signal conversion for allowing the thermal head 151 to perform the pulse width control according to the given gradation.

FIG. 11 shows the arrangement of the gradation-to-bit-train conversion table. The gradation-to-bit-train conversion table 152 consists of gradation tables 155 the number of which is equal to that of the number of actual gradations. It is assumed that, in the second example of the printing device according to the invention, sixty-four different gradations are expressed by different patterns of dots, and the gradation data 149 express sixty-four gradations as input data. In this case, the gradation-to-bit-train conversion table 152 consists of sixty-four gradation tables 155-1 through 155-64.

Each gradation table 155$i$ is made up of eight (8) bytes as shown in FIG. 12, so that sixty-four (64) gradations are expressed with sixty-four (64) bits. In FIG. 12, all of the bits of the first byte, the second byte, and the third byte are the logic level "1" and in the fourth byte three bits including the LSB are "1", and the remaining bits are the logic level "0" (hereinafter referred to merely as "0", when applicable). All of the bits of the fifth byte through the eighth byte are "0". Therefore, the gradation table of FIG. 12 represents the twenty-seventh (27th) gradation corresponding to the number of bits with the logic level of "1".

Referring back to FIG. 11, all sixty-four (64) bits in the first gradation table 155-1 are "0", thus expressing the first gradation, and N bits in the N+1th gradation table 155-N+1 are "1" to express the N-th gradation (N being an integer smaller than sixty-four (64)). The 63 bits in the last gradation table 152-64 are "1", thus expressing the sixty-fourth gradation.

The control signal generating section 142 resets a gradation counter 150 by using a reset signal included in a control signal 154 before the gradation data 149 are read out of the RAM 146. Thereafter, the control signal generating section 142 outputs a clock signal with predetermined timing to cause the gradation counter 150 to start counting. The gradation counter 150 outputs a count value signal 156 representing its count value. The count value signal 156 is applied to a ROM (Read-only-memory) 157 and is also divided into a high-order count value signal 159 representing the high-order bits of the count value and a low-order count value 161 representing the low-order bits of the count value.

The high-order count value signal 159 is supplied to the gradation-to-bit-train conversion tables 152$i$, and is used as a read instruction when the bit trains are read out of the gradation tables 155$i$ in bytes. For instance, when the high-order count value signal 159 is "0", the first byte "byte 1" is specified in the gradation table in the gradation-to-bit-train conversion table 152.

The gradation table from which data are read is determined by the gradation data 149. For instance, when the gradation data 149 of a picture element read out of the RAM 146 represents the first gradation, the first gradation table 155-1 shown in FIG. 11 is specified, and the first byte is read out of the gradation table 155-1.

The content of the high-order count value signal 159 is increased by +1 whenever a carry occurs with the low-order count value signal 161. Therefore, the content of the low-order count value signal 161 is increase by +1 whenever the gradation data 159 for a raster have been read, and when the operation of reading the gradation data for a raster is repeated eight times, then the content of the high-order count value signal 159 is increased by +1, so that the next gradation table 155$i$+1 is specified.

The data 160 are read in bytes out of the gradation-to-bit-train conversion table 153$i$ and are held by a corresponding latch circuit 162$i$. The data 160 thus held are selectively read out by a selector 162$i$ with the aid of the present low-order count value signal 161, and supplied, as selection data 167, to a thermal head 151. Similarly, the gradation data for a raster are read in a predetermined order, a predetermined byte subjected to gradation-to-bit-train conversion is read out, and a bit in the byte is selected and supplied to the thermal head 151.

Figure 13:
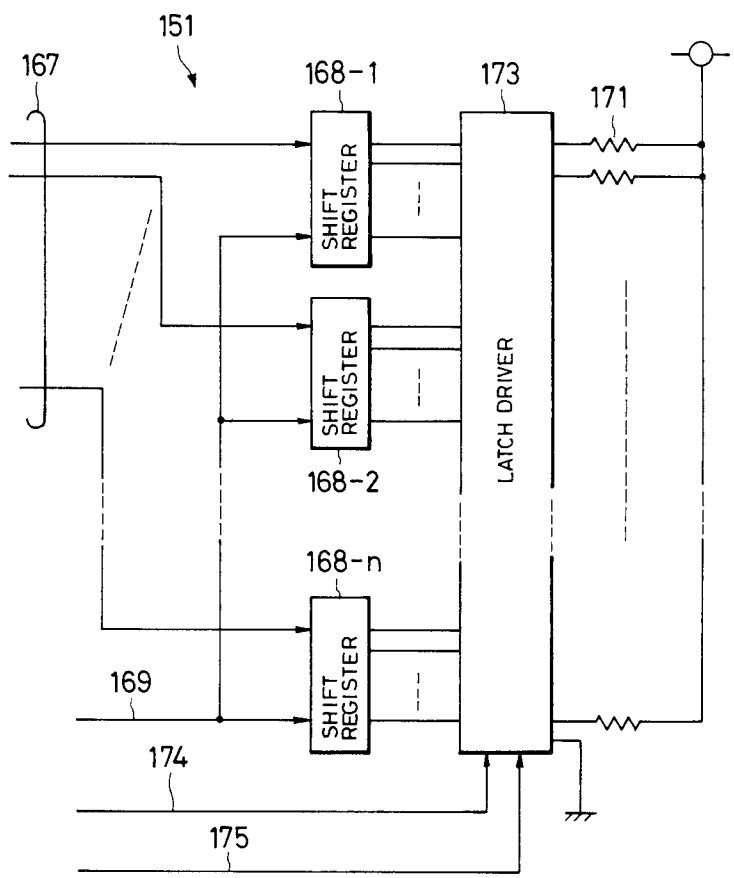
FIG. 13 is a block diagram showing a thermal head for use in the printing device of FIG. 10.
Figure 14:
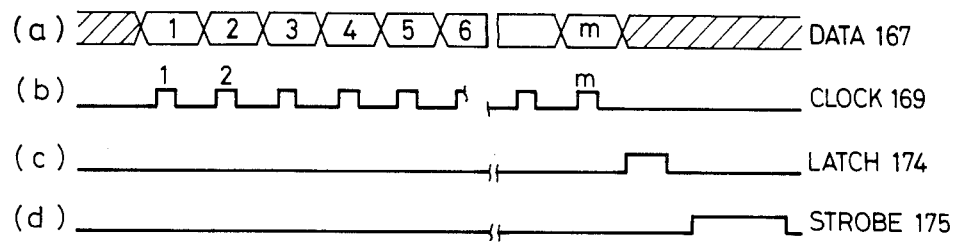
FIG. 14 is a time chart for a description of the operation of the printing device of FIG. 10.

FIG. 13 shows an example of a thermal head, and FIG. 14 is a time chart for a description of the operation of the thermal head. As shown in FIG. 13, the thermal head 151 has n shift registers 168-1 through 168-n provided, respectively, for the n blocks, and the selection data 167 are supplied to the shift registers separately according to the blocks. For this purpose, a common selector may be so designed as to select the data separately according to the systems and in a parallel mode, or a gradation-to-bit-train conversion table 155$i$, a latch circuit 162$i$, and a selector 163$i$ may be provided for each of the n blocks.

In the latter method, it is necessary to determine the block to which the gradation data read out of the RAM 146 belongs, and to supply the data to the gradation-to-bit-train conversion table 155$i$ of the block thus discriminated. This operation can be achieved by the following method: That is, in the method, the control signal generating section 142, which has recognized the relation between the shift registers 168-1 through 168-n and the gradation data 149 of picture elements, outputs a selection signal for selecting the n gradation-to-bit-train conversion tables 155 one at a time.

In FIG. 13, a clock signal 169 (the part (b) of FIG. 14) is supplied to the shift registers 168-1 through 168-n by the control signal generating section 142, and the selection data 167 (the part (a) of FIG. 14) are inputted, bit by bit, to the shift register in synchronization with the clock signal thus supplied. When the selection data m, the number of which is equal to the value obtained by dividing the total number of the heat generating elements 171 by the number n of the blocks, have been set in the shift registers 168-1 through 168-n, the data, being subjected to serial-to-parallel conversion, are supplied to a latch driver 173.

The latch driver 173 operates to latch the data with the aid of a latch signal 174 (the part (c) of FIG. 14), and to energize the heat generating elements 171 for predetermined time widths with the aid of a strobe signal 175 (the part (d) of FIG. 14). That is, for the logic level "1" of the selection data, the heat generating elements 171 are electrically energized for a predetermined period of time, so that the electrical energy is converted into the thermal energy.

In this manner, one unit of thermal energy control has been achieved. The data are inputted into the latch driver 173 sixty-four times in a renewal mode, and the same operation is performed repeatedly, so that the recording operation for one raster is accomplished.

Referring back to FIG. 10, the formation of the latch signal 174 and the strobe signal 175, and the recording operation using these signals will be described. As was described before, the ROM 157 receives the count value signal 156 representing the count value of the gradation counter 150. In the printing device which can express sixty-four gradations with the aid of the count value signal 156, a counting operation is carried out to express sixty-four gradations "0" to "63".

With the count value signal 156 as address data, the ROM 157 determines the time width for the applied pulse which is suitable for expression of a selected gradation. For instance, when the counter value signal 156 is "0", the data which corresponds to the pulse in width is read from the ROM 157, is the smallest so that the heat generating elements 171 are not substantially heated and no printing is carried out. When the count value signal 156 is "1", the data is read which corresponds to a pulse width which provides the lowest (whitish) printing density when a predetermined pulse width is added to the pulse width provided when the count value signal 156 is "1". For the other count value signals 156, the data reading operations are similarly carried out. When the count value signal 156 is "63", the data is read which corresponds to a pulse width which provides the highest printing density when a predetermined pulse width is added to the sum of the pulse widths provided when the count value signals 156 are "0" to "62".

Figure 15:
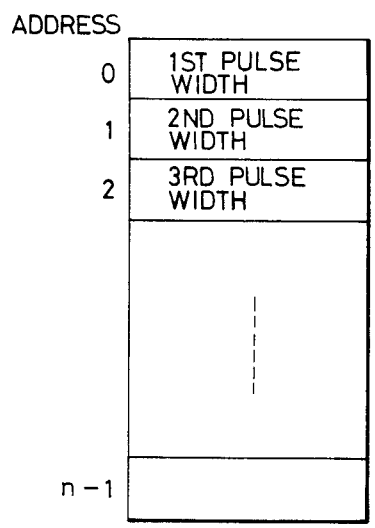
FIG. 15 is an explanatory diagram showing addresses and the corresponding contents for the ROM 157 of FIG. 10.

FIG. 15 shows the general arrangement of the ROM 157. When the number of gradations is n, address data ADDRESS 0 through ADDRESS n-1 are supplied to the ROM 157. In the memory regions of the addresses, the time widths of the applied pulses in the respective printing operations are written as numerical data. On the other hand, in recording a raster, the recording operation is divided into a maximum of sixty-four (64) parts. Prior to the start of these parts, a preset down-counter 177 receives a clear signal 178 from the control signal generating section 142 to clear its content, and receives data representing a pulse width from the ROM 157 to preset it. Thereupon, the down-counter 177 outputs a control signal 179, which is applied to a timing circuit 181. In response to the control signal 179, the timing circuit 181 forms a pulse signal having a predetermined time width. The pulse signal thus formed is supplied, as the aforementioned latch signal 174, to the thermal head 151. With the aid of this latch signal 174, the data for a raster are latched by the latch driver 173 (FIG. 13) as was described before. The timing circuit 181 further operates to raise the strobe signal 175 with predetermined timing after the latch signal 174 has been outputted.

The control signal 179 is applied also to the control signal generating section 142. The control signal generating section 142 outputs a clock signal 182 substantially simultaneously when the strobe signal 175 rises. In response to the clock signal 182, the down-counter 177 starts down-counting the preset data. When the count value reaches zero ("0"), the down-counter 177 outputs the control signal 179. In response to the control signal 179, the timing circuit 181 causes the strobe signal 175 to fall. The control signal generating section 142 detects this time instant using the control signal 179, and outputs the clear signal 178. In the same manner as above, the pulses applied are successively controlled.

By way of example, it is assumed that the printing device processes signals of four systems (n=4), and each of the systems has 256 heat generating elements 167 (m=256), the total number of the heat generating elements 167 being 1024(=256×4). In this case, the numbers of the gradation data 149 which are read out of the RAM 146 while the first through m-th clock signals 169 (shown in FIG. 14) are produced are as shown in Table 2 below:

TABLE 2

| | | Clock Signal | | |
|---|---|---|---|---|
| | | 1 | 2 | ... | 256 |
| Table | 1 | 1 | 2 | ... | 256 |
| | 2 | 257 | 258 | ... | 512 |
| | 3 | 513 | 514 | ... | 768 |
| | 4 | 769 | 770 | ... | 1024 |

In this case, 256 gradation data 149 are read out for each of the four systems, and are converted into a 64-bit binary signal by the gradation-to-bit-train conversion table 152, and the binary signal is set in the shift register 168 or the thermal head. The gradation-to-bit-train conversion table 152 and the selector 163 are controlled by the high-order count value signal 159 and the low-order count value signal 161, respectively, which are outputted by the gradation counter 155. In the above-described case, these signals are each comprised of 3 bit each, and the content of the high-order count value signal 159 is increased by +1 whenever a carry occurs with the content of the low-order count value signal 161.

In the thermal head 151, the heat generating elements 171 are energized according to pulse widths corresponding to gradations. In the case where the thermal head is of the type that the heat generating elements 171 are brought into contact with the base layer side of an ink donor film (or thermal recording medium) the surface of which is coated with thermal sublimation type ink for instance, the ink is transferred in correspondence to the amounts of thermal energy onto a recording sheet(not shown) placed on the ink donor film, thus expressing the gradations with dots.

If a different thermal recording medium is used or a different recording system is employed, then the resultant recorded image will be different even though the thermal head 51 is operated in the same manner. This difficultly is eliminated as follows: In the printing device of the present invention, the gradation data 144 are corrected in the image signal generating section 141 in advance, or they are corrected in the gradation-to-bit-train conversion table 152. The table 152 is further used to make an adjustment when the number of gradations inputted is different from the number of gradations outputted.

Figure 16:
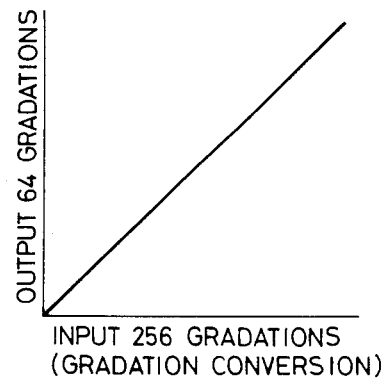
FIG. 16 is a characteristic diagram for a description of a gradation conversion in the printing device of FIG. 10.
Figures 17, 18, 19:
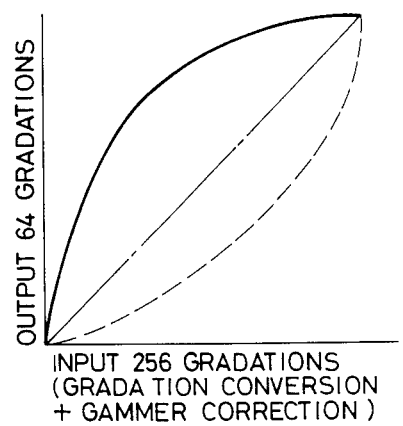
FIG. 17 is an explanatory diagram showing the contents of the gradation-to-bit-train conversion table used by the printing device of FIG. 10.
FIG. 18 is a characteristic diagram for a description of the operation in which the gradation conversion and a gamma correction are carried out by the printing device of the present invention.
FIG. 19 is an explanatory diagram showing the contents of the gradation-to-bit-train conversion table.
Figure 21:
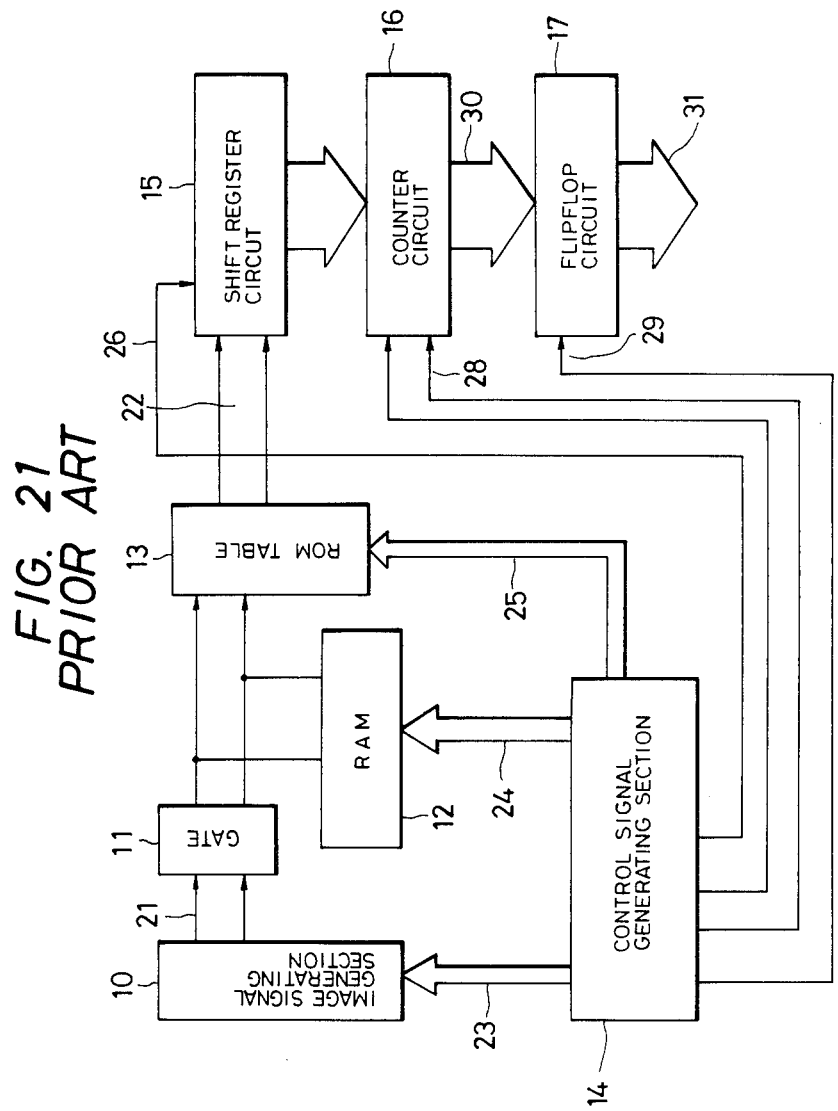
FIG. 21 is a block diagram showing the arrangement of a conventional printing device.

FIG. 16 shows a linear gradation conversion in which 256 gradations fully expressed with 8 bits are inputted while 64 gradations are outputted, and the inputs and the outputs are in linear relation to each other. In this conversion, four gradations on the input side correspond to one gradation on the output side. Therefore, the content of the gradation-to-bit-train conversion table is as shown in FIG. 17. In FIG. 17, numerical data 255 down to 0 indicated on the left are the numbers of gradation inputs, and numerical data 63 down to 9 in the frames are the number of gradations obtained through the conversion. Since the inputs and the outputs are in a linear relation to each other as was described above, four gradations on the input side are converted into one gradation on the output side at all times.

FIG. 18 shows the case where both gradation conversion and gamma correction are carried out. In this case, for compensation of the characteristics of the thermal recording medium, the gradations are nonlinearly corrected as shown in FIG. 19. The correction curve is determined according to the characteristics of the thermal recording medium. For instance, if one type of thermal recording medium is a corresponding correction curve as indicate by the broken line in FIG. 18 may be employed. Furthermore, if correction has been made in an image signal generating section 141 (FIG. 10) with a number of printing devices taken into consideration, then the conversion may be substantially similar to a simple gradation conversion as indicated by the one-dot chain line in FIG. 18.

As is apparent from the above description, the provision of the gradation to bit train conversion table 152 makes is possible not only to set the time width of the input pulse but also the adjust the number of gradations and to change the gradations to those which are desired. The gradation-to-bit-train conversion table 152 may be made up of ROMs (read-only-memories), or may be made up of RAMs (random access memories) so that the contents thereof can be selectively changed. It goes without saying that a plurality of sets of gradation-to-bit-train conversion tables may be provided and selectively used according to the operator's desire or the nature of the image data.

In the above-described second embodiment of the printing device according to the present invention, individual gradation-to-bit-train conversion tables, etc., are provided for each of the plural systems, however, a common gradation-to-bit-train conversion table, etc., may be provided to reduce the number of required components. In this case, the printing device formed is lower in manufacturing cost, although its image processing speed would be somewhat lower.

As is apparent from the above description, in the first embodiment of the printing device according to the present invention, the gradation-to-bit-train conversion tables are provided to produced the pulses whose number corresponds to the pulse width, and therefore the gradations can be expressed as desired by controlling the contents thereof. Furthermore, in the printing device, the contents of the conversion table can be readily changed by replacing the ROMs or through the use of operating switches.

In the second example of the printing device, the gradation-to-bit-train conversion tables are provided to produced pulses having a number corresponding to the desired pulse width, and therefore the gradations can be expressed as desired by controlling the contents thereof. Furthermore, in the printing device, the contents of the conversion table can be readily changed by replacing the ROMs or through the use of operating switches. As the time width of the pulse can be set or adjust as desired, the gradations ca be expressed with high fidelity using relatively small number of pulses, and the gamma correction can be achieved by utilization of the pulse width.

What is claimed is:

1. A thermal recording system including a plurality of thermal printing elements to be energized at one time in one recording operation to record an image signal comprising a plurality of picture elements represented by gradation data corresponding to the values of the picture elements, the system comprising:

gradation data storing means for storing as a recording unit a plurality of gradation data corresponding to a plurality of picture elements to be recorded in the recording operation;

gradation-to-bit-train conversion means for receiving, in units of picture elements, the gradation data corresponding to the recording unit and for outputting for each of the gradation data a corresponding bit train representing the number of pulses to be supplied to a thermal printing element to form a visible image of the corresponding gradation data, each of said bit trains corresponding to a different plurality of said gradation data;

latch means for receiving said bit trains and for latching said bit trains corresponding to each of said gradation data;

shift register means for storing print data associated with each of the thermal printing elements, said print data comprising a series of pulses for energizing said associated thermal printing element;

selector means coupled to said latch means and said shift register means for transferring one bit from said latched bit train corresponding to each of said gradation data to selected ones of the shift register means; and counter means for causing said selector means to carry out the selecting operation a predetermined number of times according to the number of gradations to be expressed, for all picture elements of each recording unit, thereby to control the number of pulses applied to each of thermal printing elements.

2. A thermal recording system according to claim 1, wherein said gradation-to-bit-train conversion means comprises a read-only-memory including a plurality of memory areas single associated with a different one of said gradation data, each of said memory areas for storing said bit data corresponding to said gradation data associated with said memory area storing said bit data.

3. A thermal recording system according to claim 1, wherein said gradation-to-bit-train conversion means includes gamma conversion means for outputting the same bit train corresponding to a variable number of different gradation data.

4. A thermal recording system according to claim 1, wherein said gradation-to-bit-train conversion means comprises N gradation-to-bit-train conversion tables herein N is equal to the number of possible gradations of said gradation data.

5. A thermal recording system according to claim 4, wherein said latch means comprises N latch circuits, each of said latch circuits being associated with a different one of said gradation-to-bit-train conversion tables and said selector means comprises N selector circuits, each of said selector circuits being associated with a different one of said latch circuits.

6. A thermal recording system including a plurality of thermal printing elements to be energized at one time in one recording operation to record an image signal comprising a plurality of picture elements represented by gradation data corresponding to the values of the picture elements, the system comprising:

gradation data storing means for storing as a recording unit a plurality of gradation data corresponding to a plurality of picture elements to be recorded in the recording operation;

gradation-to-bit-train conversion means for receiving, in units of picture elements, the gradation data corresponding to the recording unit and for outputting for each of the gradation data a corresponding bit train representing the number of pulses to be supplied to a thermal printing element to form a visible image of the corresponding gradation data, each of said bit trains corresponding to a different plurality of said gradation data;

latch means for receiving said bit trains and for latching said bit train corresponding to each of said gradation data;

shift register means for storing print data associated with each of the thermal printing elements, said print data comprising a train of pulses for energizing said associated thermal head;

selector means coupled to said latch means and said shift register means for transferring said latched bit train corresponding to each of said gradation data to selected ones of said shaft register means; and time width memory means addressed by said gradation data and cooperating with said selector means to output for each of said gradation data a corresponding driving pulse, said driving pulse being provided to a selected one of the thermal printing elements such that said thermal printing elements are adapted to be selectively energized by said driving pulses and said transferred bit train to form visible images of the gradation data on a recording medium.

* * * * *